United States Patent [19]

King, Jr.

[11] 3,875,649

[45] Apr. 8, 1975

[54] COLDWORKING METHOD AND APPARATUS WITH FRANGIBLE HEAD FLANGE

[76] Inventor: John O. King, Jr., 3990 N. Ivy Rd., Atlanta, Ga. 30342

[22] Filed: July 18, 1974

[21] Appl. No.: 489,588

Related U.S. Application Data

[63] Continuation-in-part of Ser. No. 324,485, Jan. 17, 1973, Pat. No. 3,835,688, which is a continuation-in-part of Ser. No. 268,478, July 3, 1972, Pat. No. 3,835,615, which is a continuation-in-part of Ser. No. 33,281, April 30, 1970, abandoned, which is a continuation-in-part of Ser. No. 711,368, March 7, 1968, abandoned.

[52] U.S. Cl. ............... 29/418; 29/243.52; 29/523; 72/391; 85/77; 225/1; 225/106
[51] Int. Cl. ............................................. B23p 17/00
[58] Field of Search .......... 29/523, 522, 446, 432.2, 29/432.1, 432, 243.52, 423, 418; 72/324, 391, 370; 85/72, 77, 78, 84, 86; 16/2

[56] References Cited
UNITED STATES PATENTS

| | | | |
|---|---|---|---|
| 986,905 | 3/1911 | Carlson | 285/4 |
| 2,185,483 | 1/1940 | Ward | 29/523 |
| 3,270,410 | 9/1966 | Salter et al. | 29/446 |
| 3,434,327 | 3/1969 | Speakman | 29/446 |
| 3,445,908 | 5/1969 | Straub | 29/446 |
| 3,566,662 | 3/1971 | Champoux | 72/370 |

*Primary Examiner*—C. W. Lanham
*Assistant Examiner*—James R. Duzan
*Attorney, Agent, or Firm*—B. J. Powell

[57] ABSTRACT

A method of coldworking a hole through a work piece which includes the steps of placing a seamless tubular member with a head flange through the hole in the work piece, passing a mandrel through the tubular member so that the tubular member is expanded radially and circumferentially sufficiently to expand the material in the work piece about the hole beyond its elastic limit, and circumferentially fracturing the tubular member adjacent the head flange after substantially all of the length of the tubular member has been expanded to leave a headless tubular member within the holes. The application also contemplates a tubular member construction for use in the method.

11 Claims, 6 Drawing Figures

COLDWORKING METHOD AND APPARATUS WITH FRANGIBLE HEAD FLANGE

CROSS-REFERENCE TO RELATED APPLICATIONS

This application is a continuation-in-part of my co-pending application Ser. No 324,485, filed Jan. 17, 1973, now U.S. Pat. No. 3,835,688, for "Apparatus and Method for Sizing Holes" which is in turn a continuation-in-part of my co-pending application Ser. No. 268,478, now U.S. Pat. No. 3,835,615, filed July 3, 1972 which is in turn a continuation-in-part of my earlier filed application Ser. No. 33,281, filed Apr. 30, 1970, now abandoned, which was in turn a continuation-in-part of my earlier filed application Ser. No. 711,368 filed Mar. 7, 1968, now abandoned.

BACKGROUND OF THE INVENTION

It is well known that the fatigue life of a stressed work piece with a hole therethrough can be significantly increased by cold-working the hole. While several techniques have been developed to coldwork the hole to increase the fatigue life, one technique uses a seamless tubular member with a head flange on one end thereof which is positioned in the hole so that the head flange of the tubular member rests against one surface of the work piece. An expansion mandrel is then passed through the seamless tubular member and the head flange so that the tubular member is expanded into contact with the material of the work piece and then the material about the hole expanded to coldwork same. Sometimes it is desirable to have a headless tubular member within the hole after the coldworking operation, however, at the same time, it is desirable to have the head flange on the seamless tubular member during the coldworking operation to help support the tubular member along its length and to provide a working surface against which the coldworking tool can bear while the expansion member is pulled through the tubular member. None of the prior art coldworking techniques disclose a system which has the capability of providing an annular head flange during the coldworking operation but removing the annular head flange as an incident to the coldworking operation so that the tubular member within the work piece after coldworking is headless.

SUMMARY OF THE INVENTION

These and other problems and disadvantages associated with the prior art are overcome by this invention disclosed herein in that a technique for coldworking a hole through a work piece is provided where an annular head flange is provided on one end of a seamless tubular member during the coldworking operation but where the annular head flange is removed from the seamless tubular member as an incident to the coldworking operation. Thus, it will be seen that the tool which forces the expansion mandrel through the seamless tubular member can bear against the head flange of the tubular member during the coldworking operation to prevent damage to the surface of the work piece about the hole but is removed from the seamless tubular member as an incident to the coldworking operation so that a headless tubular member is provided in the hold through the work piece after the coldworking operation.

The apparatus of the invention includes generally a seamless tubular member having an annular head flange at one end thereof which is positionable in the pilot holes through the work pieces to be enlarged, and a mandrel with an expansion section thereon of a prescribed diameter larger than the inside diameter of the tubular member so that as the mandrel is forced through the tubular member, the tubular member will be enlarged. The tubular member is internally grooved circumferentially in a plane generally normal to the centerline of the tubular member and at a point adjacent the annular head flange at the end of the tubular member so that as the expansion mandrel is forced through the tubular member, the expansion of the tubular member at the groove causes the tubular member to fracture and release the head flange from the enlarged seamless tubular member as an incident of the coldworking operation.

These and other features and advantages of the invention will become more clearly understood upon consideration of the following specification and accompanying drawings wherein like characteristics of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figures 1, 2:
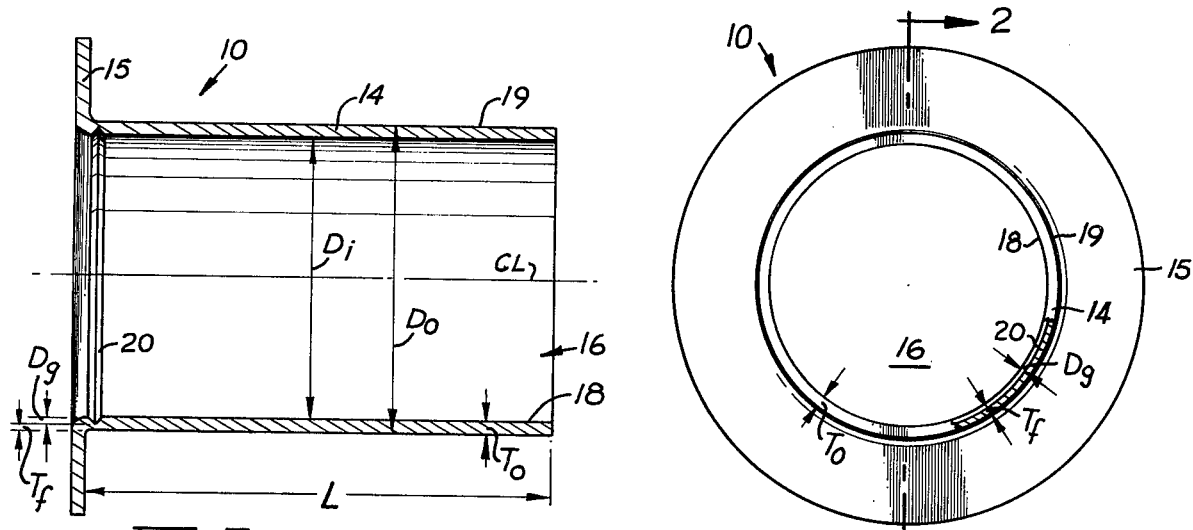
FIG. 1 is an enlarged end view of the tubular member of the invention.
FIG. 2 is a longitudinal cross-sectional view taken along line 2—2 in FIG. 1.

Referring to the figures, it will be seen that a special tubular member 10 through which the holes H in the work pieces P are to be coldworked is illustrated. The tubular member 10 as best seen in FIGS. 1 and 2 includes an annular seamless side wall 14 with an annular head flange 15 integral with one end thereof. The head flange 15 may be normal to the centerline CL of the tubular member 10 as shown in solid lines in FIG. 2 if the resulting joint is to include an exposed head fastener or may be located at the appropriate angle if the resulting joint is to include a countersunk head fastener. The side wall 14 defines a passage 16 therethrough about the centerline CL with a substantially constant outside diameter $D_o$ and inside diameter $D_i$ along its length. It is to be further understood that the side wall 14 may have an inwardly tapering section at that end opposite the head flange 15 for use during insertion of the tubular member 10 into the holes through the work piece to prevent damage thereto. It will further be noted that the thickness $T_o$ of side wall 14 is substantially constant along it's length so as to define concent ic inner and outer surfaces 18 and 19 and has a prescribed length L. The thickness $T_o$ and the material of the side wall 14 are such that the side wall 14 can be radially and circumferentially expanded to coldwork the material of the work piece about the hole. One such material that has been found satisfactory is stainless steel where the thickness $T_o$ of the side wall 14 is approximately 0.008 0.032 inch and where the work pieces are of a material such as an aluminum alloy. It is to be understood that different materials and thicknesses may be used without departing from the scope of the invention.

Figure 4:
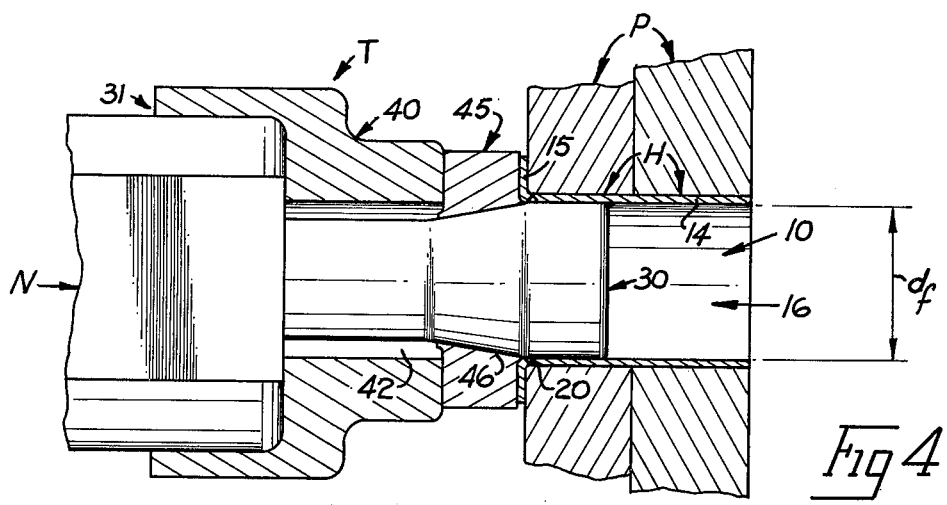
FIG. 4 is a view similar to FIG. 3 showing the invention in use.

A circumferentially extending V-shaped groove 20 is provided around the inside of side wall 14 and opens onto the inside surface 18 thereof at the juncture of the side wall 14 and the head flange 15. It will be noted that the groove 20 lies in a plane generally normal to the centerline CL of the tubular member 10 and extends completely around the side wall 14 to reduce the strength of the side wall 14 therealong. The depth $D_g$ of the groove 20 is selected so that the side wall 14 will fracture therealong when the side wall has been radially and circumferentially expanded a prescribed amount. The holes through the work pieces are generally diametrically expanded in the neighborhood of 5 and ½ percent of the inside diameter $d_f$ of the expanded tubular member 10 as seen in FIG. 4. The actual diametrical expansion range normally used where the diameter $d_f$ is 3/16 inch is 0.009–0.013 inch. For a diameter $d_f$ of one-fourth inch, an expansion of 0.010–0.014 inch is normally used and for a diameter $d_f$ of 5/16 inch, an expansion of 0.012–0.016 is normally used. Thus, the depth $D_g$ is selected so that the side wall 14 will fracture along groove 20 upon a diametrical expansion thereof in the neighborhood of five and one-half percent of the expanded inside diameter $d_f$ of tubular member 10. One such invention that has been found satisfactory is where the thickness $T_f$ of the side wall 14 between the bottom of groove 20 and the outside surface 19 is approximately 0.004 inch.

Figure 3:
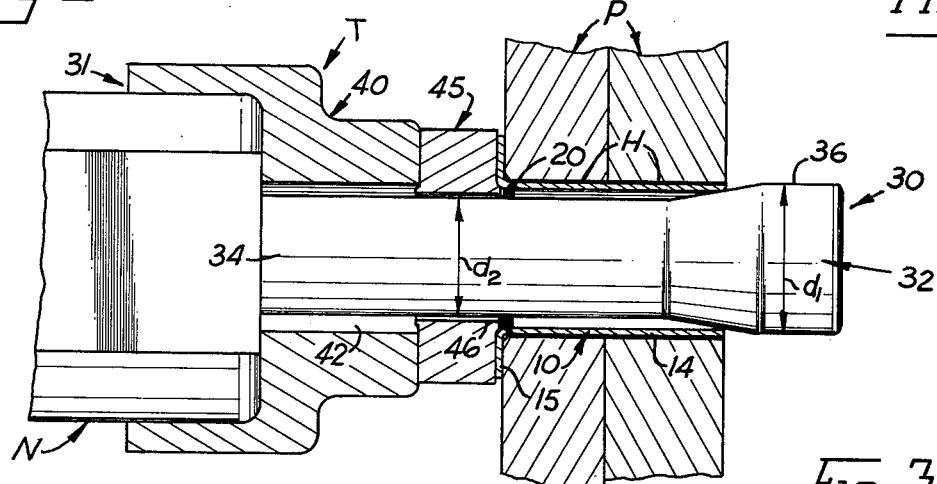
FIG. 3 is a cross-sectional view showing the invention ready for use.

The installation of the tubular member 10 is illustrated in FIGS. 3–6. The tubular member 10 is installed using an installation tool T such as that disclosed in my co-pending application Ser. No. 324,485 which includes a mandrel 30 and a driving unit 31 for forcing the mandrel 30 through the tubular member 10. As best seen in FIG. 3, the mandrel 30 includes an expansion section 32 at one end with a support section 34 to be gripped by the driving unit 31 and forced through the tubular member 10. The expansion section 32 defines a major cylindrical surface 36 at its free end with a tapered expansion surface 30 connecting the surface 36 with the support section 34. The diameter $d_1$ of the sizing surface 36 is larger than the inside diameter $D_i$ of the tubular member 10 and the diameter $d_2$ of the support section 34 is smaller than the inside diameter $D_i$ of the passage 16 through the tubular member 10.

The driving unit 31 includes an adapter 40 and a commercially available lockbolt installation tool (not shown) with a self-releasing pulling nose assembly N (partly shown). The support section 34 is gripped in the nose assembly N at the end opposite the expansion section 32 and the mandrel 30 is pulled toward the nose assembly N. The adapter 40 fits over the end of the nose assembly N and has a passage 42 therein which is aligned with the hole (not shown) in the end of the nose assembly when the adapter is in the position shown in FIG. 3. The passage 42 has a diameter such that the major surfaces 36 will just slidably pass therethrough to prevent the surface 36 of mandrel 30 from being caught in the nose assembly N since this section is normally larger than the opening in the nose assembly.

A backup member 45 may be used to prevent the end of the tubular member 10 adjacent the head flange 15 from being partially extruded from that side of the work pieces P from which the mandrel 30 exits the tubular member 10. The backup member 45 is more particularly disclosed in my co-pending application Ser. No. 324,485 and has a central aperture 46 therethrough with a diameter at least as small as the inside diameter of the tubular member 10 prior to enlargement. The backup member 45 is made out of a material which can be readily radially expanded to allow the expansion section 32 of the mandrel 30 to pass therethrough as disclosed in my co-pending application Ser. No. 324,485.

The tubular member 10 is assembled onto the installation tool T by inserting the support section 34 of the mandrel 30 through the tubular member 10 at the end opposite the head flange 15, inserting the section 34 of the mandrel 30 through the aperture 46 of the backup member 45, and then through the adapter 40 into the nose assembly N. In this condition, the tubular member 10 is inserted through the hole H in the work pieces P with a lockbolt pulling tool so that the head flange 15 bears against one side of the work pieces P. The lockbolt installation tool in then actuated so that the mandrel 30 is pulled toward the nose assembly N to cause the expansion surface 38 to pass into the end of the side wall 14 opposite the head flange 15 followed by the major expansion section 36. As the tapered expansion section 38 and the cylindrical section 36 are longitudinally forced through the side wall 14, the side wall 14 of the tubular member 10 is expanded radially and circumferentially sufficiently to cause the side wall 14 to engage the work pieces about the holes H and coldwork the material of the work piece about these holes.

Figure 5:
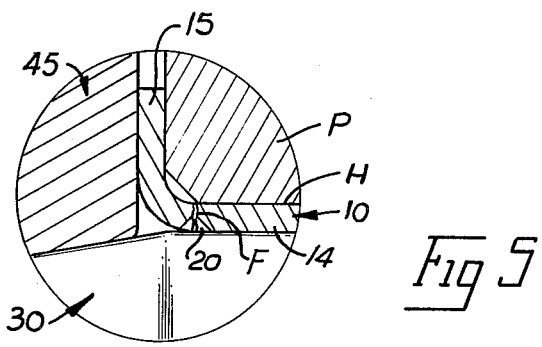
FIG. 5 is an enlarged portion of FIG. 4 showing the fracture of the head flange.
Figure 6:
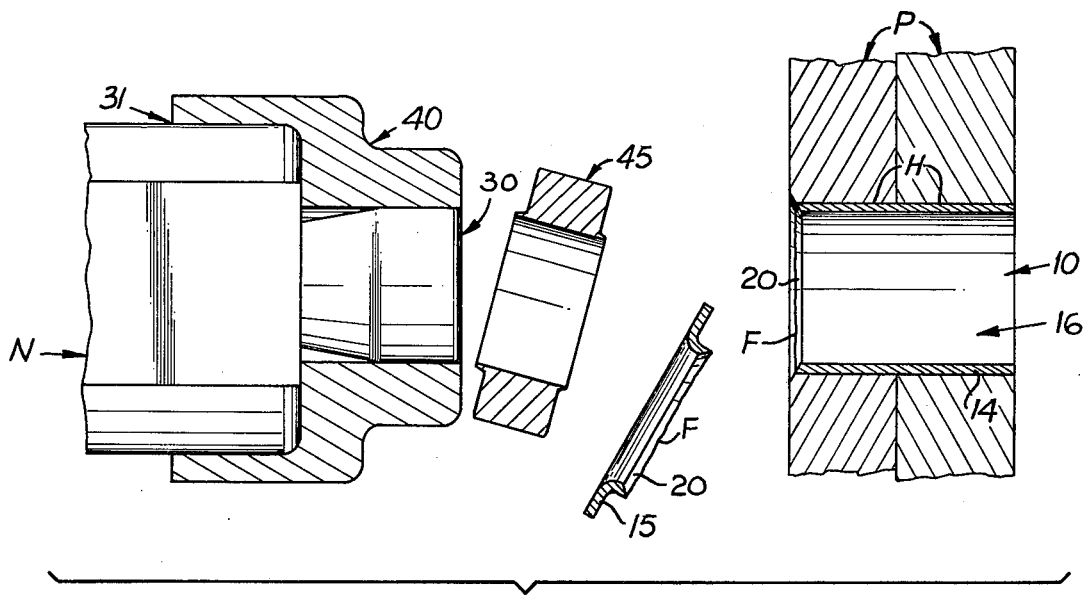
FIG. 6 is a view similar to FIG. 3 after the coldworking operation.

When the tapered expansion section 38 reaches the groove 20, it will be seen that the side wall 14 of the tubular member 10 is expanded radially and circumferentially sufficiently to cause the side wall 14 to fail at the section between the bottom of groove 20 and the outside surface 19 of the side wall 14 as illustrated in FIG. 5. Because substantially all of the radial and circumferential expansion of side wall 14 has occurred prior to the fracture of the side wall 14 along the groove 20, it will be seen that the head flange 15 serves to support the side wall 14 along its length as the side wall 14 is expanded. The head flange 15 is separated from the side wall 14 along the groove 20 as is indicated at the fracture F in FIG. 5 so that it is separated. As the mandrel 30 continues to move into the adapter 40 and through the backup member 45, it will be seen that the head flange 15 is separated from the side wall 14 and drops away as illustrated in FIG. 6. It will also be seen that the backup member 45 will drop away as seen in FIG. 6. Because that portion of the groove at which the fracture F occurs is on the inside of the side wall 14, it will be seen that any irregularity at the fracture F will not come into contact with the fastener to be placed through the side wall 14 to complete the joint.

While specific embodiments of the invention have been disclosed herein, it is to be understood that full use may be made of modifications, substitutions, and equivalents without departing from the scope of the inventive concept.

I claim:

1. A method of coldworking a hole through a work piece comprising the steps of:
    a. radially and circumferentially expanding a tubular member having an annular head flange integral with one end thereof held within the hole through the work pieces so that the material about the hole is expanded beyond its elastic limit; and,
    b. circumferentially fracturing the tubular member at the juncture with the head flange after substantial expansion of the tubular member.

2. The method of claim 1 wherein the step of expanding the tubular member includes passing a mandrel having an expansion section thereon larger than the initial inside diameter of the tubular member axially through the tubular member.

3. The method of claim 2 wherein the tubular member has a circumferentially extending groove on the inside thereof at the juncture of the tubular member and the head flange to reduce the strength of the tubular member thereat sufficiently to cause the tubular member to fracture circumferentially as an incident to the expansion of the tubular member a prescribed amount.

4. The method of claim 3 wherein the prescribed amount of expansion is approximately five and one-half percent of the inside diameter of said tubular member after expansion.

5. Apparatus for coldworking a hole through a work piece including a tubular member comprising an annular seamless side wall defining a passage therethrough, an annular head flange integral with one end of said side wall and extending outwardly therefrom, said side wall including a circumferentially extending weakened section around its circumference adjacent the juncture of said side wall and said head flange constructed and arranged to cause said side wall to fracture circumferentially along said weakened section upon a prescribed radial and circumferential expansion of said annular side wall in the vicinity of said weakened section.

6. The apparatus of claim 5 wherein said side wall defines a circumferentially extending groove therein along the inside thereof defining said weakened section circumferentially around said side wall at the juncture of said side wall with said head flange.

7. The apparatus of claim 6 wherein said side wall has a substantially constant thickness along its length.

8. The apparatus of claim 7 wherein said side wall has a substantially constant diameter along its length.

9. The apparatus of claim 8 wherein said groove is constructed and arranged to cause said side wall to fracture thereat upon a diametrical expansion of said side wall approximately 5 and ½ percent of the diameter of the inside diameter of said tubular member in its expanded condition.

10. The apparatus of claim 9 further including a mandrel having an outside larger and an outside smaller diameter, said larger diameter larger than the inside diameter of said tubular member and said smaller diameter smaller than the inside diameter of said tubular member; and forcing means for forcing said mandrel through said tubular member to diametrically enlarge said side wall at least five and one-half percent of the desired expanded inside diameter of said tubular member.

11. The apparatus of claim 10 further including a backup member having an aperture therethrough at least as small as the inside diameter of said tubular member and larger than said smaller diameter of said mandrel so that when said smaller diameter is inserted through said passage of said tubular member and said backup member positioned on said smaller diameter in opposition with said larger diameter across said tubular member, said larger diameter and said backup member can be forced toward each other to cause said larger diameter to pass through said passage and said aperture to enlarge the diameter of said tubular member and the holes through said tubular member.

* * * * *